Patented July 2, 1946

2,402,961

UNITED STATES PATENT OFFICE 2,402,961

PERTHIOCYANIC METAL PIGMENTS

William H. Hill, Mount Lebanon, Pa., assignor, by mesne assignments, to Koppers Company, Inc., a corporation of Delaware No Drawing. Application May 16, 1942, Serial No. 443,301

13 Claims. (Cl. 106—176)

The present invention relates to novel metallo-organic pigments having variegated colors.

In my copending application, Serial No. 443,302, filed of even date, the present inventor has disclosed to the art a new yellow pigment material that is the product of such polymerization of thiocyanic acid as takes place when this compound is liberated under carefully controlled conditions by means of a stronger acid from a multiplicity of its salts. This pigment material was in the said copending application referred to for the sake of brevity as "perthiocyanic acid" although it is realized that it may, under some modifications and variations of the conditions under which the thiocyanic acid is liberated from its salt combinations and thereafter polymerized, contain minor quantities of incompletely polymerized material and varying proportions of isomeric forms, and may therefore not be constituted entirely of a single chemical entity; this nomenclature will be also retained in the following description of the preparation of many metallic salts of this perthiocyanic-acid material which have now been made and examined and shown to provide a series of new and interesting and attractive variations, alterations, and changes in the color of this basic pigment material and are themselves also of important utility as colored pigments in the art of coating compositions.

An object of the present invention is the provision of a series of novel and varicolored metalloorganic pigments that are especially useful to the paint and plastics industries.

A further object of invention is the provision of new pigments that exhibit many of the advantages of perthiocyanic acid itself but make possible its use in a wide range of color choices.

A further object of invention is to provide method and means whereby the pure color of a given salt of the perthiocyanic acid can in the course of its manufacture be attractively modified and varied to give the so-called "off-shade" hues and tints thereof that are in great demand in the decorator's field.

The invention has for further objects such other improvements and such other operative advantages or results as may be found to obtain in the processes hereinafter described or claimed.

The perthiocyanic-acid pigment material described in the above-mentioned copending application has the universally accepted empirical formula, $H_2C_2N_2S_3$ and exhibits, as its name implies, the properties of an acid and it is capable of forming soluble salts with basic materials that can be inorganic or organic in nature, for example, with the alkali metals, and it can also form stable insoluble salts with a multiplicity of the more common and also the rarer metals by their precipitation from a solution of a soluble perthiocyanate salts. Many of these insoluble metal salts are highly colored and make excellent pigments.

During its reaction with, for example, hydroxides of the alkali metal group, or with the alkaline earth group, the perthiocyanic acid shows interesting and characteristic changes; i. e., an existing ratio between its isomeric forms tends to be shifted to a new one and in the course of so doing some of the sulphur content of the material is precipitated out of its molecular structure and can even be removed from the resultant solution of material; however, if the so-precipitated sulphur is not removed, it immediately starts to return to solution and combine with the initially dissolved material and, ultimately, in a short time, the end result of the reaction is to produce a clear solution of the alkali-metal salt of the perthiocyanic acid which is a divalent compound. According to the invention, as will be hereinafter described, this phenomenon is utilized to produce attractive and wanted variations in the shade or tint of the basic normal color of the perthiocyanic metal pigment being manufactured, or considerably to alter such color from that which would otherwise obtain.

When perthiocyanic acid has been acted upon by, for example, a solution of sodium hydroxide, under conditions that will be hereinafter described, to form a solution of a soluble salt and there is added to such solution a soluble salt of such heavy metals as, lead, manganese, copper, chromium, zinc, cadmium, cobalt, nickel, mercury, silver, vanadium, iron, thallium, uranium, antimony, and cerium, their corresponding insoluble perthiocyanic metal salts can be produced and precipitated. Some of them are strikingly brilliant in their color whereas others are more somber and pastel-like. The colors of the resultant perthiocyanic salts of these heavy metals can be described, in their above-stated sequence, as a vivid clear yellow, greenish yellow, brown-red, lemon yellow, yellow-orange, ivory-yellow, brownish red, brown-red, tan, orange, green, brown, brilliant orange, yellow, orange, and tan.

These perthiocyanic metal salts have, as the result of extensive study and testing, shown themselves all to serve admirably as pigments for use in paints, varnishes, lacquers, enamels, natural and synthetic rubber and rubber-like materials, thermoplastic and thermosetting materials and the like. They are substantially insoluble in water and in the usual organic solvents. They grind readily in various paint vehicles, the resulting paints having good brushing and spraying properties and good covering power. The paints comprising them do not darken or deteriorate under the influence of ultraviolet light, as employed in standard acceleration tests to determine their stability and resistance. Paints made with them exhibit corrosion inhibiting properties and thus serve to enhance protection to a metal substratum to which they are applied. They do not at room temperatures function as polymerization catalysts in aminoplastic lacquers and other compositions. They are heat resistant up to and above temperatures at which most film-forming bases in paints disintegrate. Admixtures of different of the perthiocyanic metal pigments can of course be employed to produce pigments of various color qualities. They are compatible with and can be successfully employed in admixtures with such known pigments as lithopone, zinc white, lead white and titanium dioxide to produce pigments having varied shades. These perthiocyanic metal pigments exhibit no antioxidant capacity, as is the case with the parent perthiocyanic acid, hence paints made therefrom and relying for their drying on an atmospheric oxidation reaction have unimpaired drying characteristics; in fact, some of said derivatives, for example, those of cobalt exhibit pronounced dryer effects. It is to be noted also that the said perthiocyanic metal pigments are not only valuable for use in ordinary applications but that those derived from copper, lead, mercury, thallium, and the like, are effective as pest-control agents, for example, as insecticides and fungicides; they are also valuable as toxic ingredients in anti-fouling marine paints, and the like.

The perthiocyanic acid employed as an intermediate material for production of the perthiocyanic metal pigments can be produced according to any known process, or by the process disclosed in my copending application, Serial No. 443,302, which is as follows:

Molar proportions of ammonium thiocyanate and sulphuric acid in the form of 60% and 75% aqueous solutions respectively, are gradually admixed by adding the acid to the salt solution at a rate adapted to maintain the temperature of the admixture at between about 35° C. and 40° C. After standing about 120 hours in admixture, the yellow precipitate of perthiocyanic acid is filtered off and residual soluble salts therein are extracted by washing or by resuspension in water, or by any preferred method. The so-formed perthiocyanic-acid product is then ready for conversion into the preferred metallic salt.

To form the perthiocyanic metal pigments of invention, this perthiocyanic-acid product is treated with sodium-hydroxide solution, or the equivalent, whereby solution is effected in a short time with the above-mentioned intermediate formation of some precipitated elemental sulphur. To the resulting sodium salt solution is now added an aqueous solution of a salt of the metal that is to be converted into its perthiocyanic pigment, if, for example, lead acetate is employed, a precipitate of perthiocyanic lead pigment is formed, as a clear, vivid yellow product. This precipitate is removed by filtration, the resulting filter cake is washed to remove soluble salts and thereafter dried at about 110° C. Upon grinding to a preferred particle size, it is ready to be incorporated as a pigment in a paint vehicle or in a plastics compound.

The above-mentioned phenomenon of elemental-sulphur liberation, that occurs during the course of the reaction between the said perthiocyanic-acid product and sodium hydroxide, causes some reversion of said product to dithiocyanic acid which combines with the alkali to form sodium dithiocyanate in the resultant solution; however, if the liberated sulphur is allowed to remain therein the major portion of it dissolves by combination with the sodium dithiocyanate to form soluble sodium perthiocyanate. This combination is not an instantaneous reaction but requires time and therefore the longer the elapse of time between the initial alkali treatment and the precipitation of the perthiocyanic metal pigment of invention the larger will be the proportion of the pigment product that is in the form of the metal perthiocyanate.

A minor proportion of this liberated elemental sulphur dissolves in the added alkali to some form of sulphide or polysulphide which causes precipitation of a sulphide of that metal of which the salt is added to the perthiocyanic alkali solution to form the pigment product of invention; this is especially the case if the perthiocyanic-acid product and the alkali are reacted in the molar ratio of one to two respectively. If such metallic sulphides are dark in color or possess hues differing from those of the precipitated perthiocyanic metal compounds themselves they are according to the present improvement optionally either entirely or in part co-precipitated with the perthiocyanic metal pigment to produce attractive variations in the basic color value of the perthiocyanic pigment produced from a given metal. If it is desired to incorporate in a given pigment only a portion of the metallic sulphide that is made available by the sulphide present in a given solution of the alkali perthiocyanate, or to exclude such sulphides entirely from the produced pigment, the sulphide or polysulphide content of the alkali solution can be preferentially in part or entirely removed by adding to the solution the requisite amount of a metal ion that precipitates its sulphide in preference to its perthiocyanate and thereafter filtering the so-produced metallic sulphide from the solution before precipitation of the desired perthiocyanic metal pigment. In this wise more or less metallic sulphide can be incorporated in the desired pigment or excluded therefrom entirely. In the latter case, a perthiocyanic metal pigment of unmodified color value is obtained. It has also been found that if the alkali perthiocyanate solution is treated with such acids as acetic or sulphuric before precipitation of the perthiocyanic metal pigment therefrom that its capacity to produce a metallic sulphide with the added metal salt is entirely destroyed.

It has also been found that these sulphide compounds are not available for the above-mentioned purpose if the perthiocyanic-acid product is treated for its solution with less than that amount of alkali which will completely react with said product in the admixture of the two, and that such is the case whether or not precipitated elemental sulphur is immediately filtered off or is allowed to dissolve in the resultant solution. That is to say, that when less than the stoichiometric ratio of alkali is employed to dissolve the perthiocyanic-acid product, the pigment precipitated therefrom will always have substantially its true color value.

It is also within the scope of the invention to control the amount of free alkali that is present in the solution of alkali perthiocyanate at the time the metal pigments of invention are precipitated therefrom, as a means for further modifying their basic color values. By means of the uncombined free alkali, oxides or hydroxides of the employed metal can be also coprecipitated with the perthiocyanic pigment and their effect employed in producing variations in the color value of a pigment obtained from a given metal.

In addition, if there is reacted with a given quantity of perthiocyanic-acid material less alkali than is required completely to dissolve the same, the perthiocyanic metal pigment can be precipitated in the presence of the residual perthiocyanic acid and the resultant product is a blend between its yellow color and the color of the perthiocyanic product of the employed metal. Other possible combinations and variations of the above-given for varying the basic color value of a perthiocyanic metal pigment, or pigments, are within the skill of the art.

As an example of the divers color effects it has been possible to produce in the case of one metal, by practicing the above-described modifications of preparing the present novel pigments, the case of those prepared with lead can be cited as representative. The perthiocyanic lead pigment, prepared as described in Example 2, is a vivid yellow material and when it is prepared under conditions whereby it contained minor variable amounts of the metal sulphide, tan-colored, brownish, and even an olive greenish hue of the resultant pigment was obtained.

The following specific examples are illustrative of methods of preparing perthiocyanic metal pigments and of the diversity of results obtainable by their employment.

*Example 1*

150 parts (1 mole equivalent) perthiocyanic acid were stirred in 500 parts water, and 84 parts (slightly in excess of 2 moles equivalent) of sodium hydroxide pellets were added. The resultant yellow colored slurry, comprising a suspension of sulphur in a solution of perthiocyanic sodium salt was filtered and the filter cake washed with 200 parts water. Then 379 parts lead acetate (1 mole equivalent) were dissolved in 1000 parts water and the so-formed solution added to the yellow-colored solution of perthiocyanic sodium salt. At first, the yellow solution turned darker and reddish in color, then a reddish-yellow precipitate appeared, which on further addition of lead acetate solution changed to a greenish-yellow color. During the precipitation 800 parts water were added in small portions, to insure easy stirring of the slurry. The final slurry was filtered, the filter cake washed with further quantities of water, and thereafter dried at about 110° C. The ground, dry product had a light, olive-green color and amounted to about 385 parts by weight. The sulphur filtered from the perthiocyanic sodium salt solution came to 3 parts by weight. Had the theoretical quantity of sulphur, comprising an atom thereof, been separated from the original perthiocyanic acid, it would have amounted to 32 parts by weight.

*Example 2*

150 parts (1 mole equivalent) perthiocyanic acid were stirred in 500 parts water, and a solution of 42 parts (slightly in excess of 1 mole equivalent) of sodium hydroxide pellets dissolved in 250 parts water was added. This quantity of sodium hydroxide was equivalent to half the quantity thereof employed in Example 1. The perthiocyanic sodium salt solution was filtered to remove therefrom undissolved perthiocyanic acid and sulphur. To the clear, yellow-colored filtrate there was added a solution of 190 parts (½ mole equivalent) lead acetate in 500 parts water. With the first addition of lead acetate there appeared a light yellow-colored precipitate which went into solution on stirring, giving said solution an intense orange-yellow color. With further small additions of lead acetate said solution turned a deep reddish orange. Finally a clear yellow precipitate was obtained. During the precipitation about 250 parts water were added to insure easy stirring of the slurry. The precipitate was filtered, washed with further quantities of water and then dried at 110° C. It had a luminous, clear, yellow color and amounted to about 180 parts by weight, an almost theoretical yield.

*Example 3*

The filter cake obtained during production of perthiocyanic sodium salt solution in Example 2, and containing perthiocyanic acid and sulphur was stirred in 250 parts water and a solution of 21 parts (slightly in excess of ½ mole equivalent) of sodium hydroxide pellets dissolved in 250 parts water was added. This quantity of sodium hydroxide was equivalent to half the quantity thereof employed in Example 2. Filtration yielded a clear yellow perthiocyanic sodium salt solution and a filter cake which still contained some perthiocyanic acid as well as sulphur. To this solution there was added a solution of 95 parts lead acetate (¼ mole equivalent) in 500 parts water. Another 500 parts of water were gradually added during the precipitation. The phenomena observed during the precipitation were about the same as those of Example 2, but the larger quantity of liquid seemed to make the precipitate smoother and much more uniform, though somewhat gelatinous in consistency. It was filtered off, washed with further quantities of water and dried at 110° C. This product was obtained in a yield of 90 parts by weight which is an almost theoretical yield; it had an orange-yellow color.

*Example 4*

1500 parts (10 moles equivalent) perthiocyanic acid were stirred with 5000 parts water and the solution admixed with a solution of 420 parts (in slight excess of 10 moles equivalent) of sodium hydroxide pellets dissolved in 2500 parts water. After 15 minutes' agitation the slurry was filtered and the filter cake washed with water until the total volume of filtrate amounted to 10,000 parts. The filtrate was then divided into five portions of 2000 parts each and the said portions were then precipitated, each with one of the following solutions:

(a) 288 parts (1 mole) zinc sulphate, $ZnSO_4 \cdot 7H_2O$ in 1000 parts water;

(b) 256 parts (⅓ mole) cadmium sulphate, $3CdSO_4 \cdot 8H_2O$ in 1000 parts water;

(c) 238 parts (1 mole) cobalt chloride, $CoCl_2 \cdot 6H_2O$ in 1000 parts water;

(d) 281 parts (1 mole) nickel sulphate, $NiSO_4 \cdot 7H_2O$ in 1000 parts water;

(e) 333 parts (⅔ mole) chrome alum, $$KCr(SO_4)_2.12H_2O$$

in 2000 parts water.

Precipitations were carried out as in the previous examples, the slurries were filtered and washed. The dried filter cakes had the following colors:

(a) Yellow, with slight orange tint;
(b) Ivory-yellow;
(c) Chocolate;
(d) Chocolate;
(e) Lemon-yellow.

It is to be noted that during the precipitations of the nickel and cobalt salts the first precipitates went back into their respective solutions, causing them to turn a very intense deep brown-red. The dried perthiocyanic cobalt and nickel salts are glossy black in mass, but turn chocolate brown on grinding.

Example 5

In a paint mill, supplied with steel balls, there was ground for a period of 24 hours an admixture comprising, by weight, 600 parts perthiocyanic lead pigment as made in Example 2 and 700 parts bronzing liquid and 90 parts toluene. The resultant paint was exceedingly smooth and had a clear yellow color. When brushed out on steel panels, it dried dust-free in about three hours and tack free in about five hours.

Example 6

In a paint mill, supplied with porcelain balls, there was ground for a period of 24 hours an admixture comprising, by weight, 500 parts perthiocyanic lead pigment as made in Example 2 and 1000 parts spar varnish. The smooth, brilliantly yellow product was brushed out on steel plates where it dried dust free in about one hour and tack free in about three hours.

Example 7

In a paint mill, supplied with porcelain balls, there was ground for a period of 24 hours an admixture comprising, by weight, 350 parts perthiocyanic lead pigment as made in Example 2 and 1000 parts thermoplastic cellulose lacquer. A very satisfactory smooth yellow lacquer resulted, which was easily sprayed out on steel plates with a paint gun.

Example 8

In a paint mill, supplied with steel balls, there was ground for a period of 24 hours an admixture comprising, by weight, 300 parts perthiocyanic lead pigment as made in Example 2 and 1000 parts of thermosetting lacquer of the urea-formaldehyde type. No thickening was observed, hence said perthiocyanic lead pigment did not act as a polymerization catalyst at room temperatures. The resultant lacquer was of excellent quality. It was brushed out on steel panels and baked for one hour and ten minutes at 148° C., yielding a hard, flawless enamel coating.

Example 9

In a paint mill, supplied with porcelain balls, there was ground for a period of 24 hours an admixture comprising, by weight, 350 parts of perthiocyanic lead pigment as made in Example 2 and 1000 parts melamine-formaldehyde lacquer. As in Example 8, there was no evidence of thickening, hence said pigment, at room temperature, did not act as polymerization catalyst with aminoplastic lacquers. The smooth, vividly yellow lacquer was brushed on steel panels and baked for 50 minutes at 151° C. Enamel coatings of exceptional hardness were thus obtained.

A number of the panels obtained in testing the compositions made according to the above Examples 5, 6, 7, 8 and 9 were subjected to an accelerated weathering test. In this test the panels were hung in a rotating machine and alternately and intermittently sprayed with water and illuminated with a strong ultraviolet light in such fashion that 18 hours of ultraviolet light were provided during each day. After ten days of exposure in said manner, the panels were inspected. There was little change in the pigment color, although the conditions had been severe enough to destroy some of the paint bases.

Example 10

In a paint mill, supplied with steel balls, there was ground for a period of 24 hours an admixture comprising, by weight, 400 parts of perthiocyanic zinc pigment as made in Example 4 and 900 parts cellulose lacquer. When removed from the paint mill the lacquer was found to have increased in viscosity to an appreciable extent and to be quite thixotropic. The said lacquer was brushed out on steel panels and while the covering power of the wet coatings was not particularly good, they improved very appreciably on drying, so that the finished panels were satisfactory.

Example 11

In a paint mill, supplied with steel balls, there was ground for a period of 24 hours an admixture comprising, by weight, 400 parts of perthiocyanic zinc pigment as made in Example 4, 800 parts spar varnish and 180 parts toluene. The resulting paint was thixotropic and was thereafter thinned out with 180 parts toluene. It brushed out satisfactorily and dried in normal time.

Example 12

In a paint mill, supplied with porcelain balls, there was ground for a period of 24 hours an admixture comprising, by weight, 400 parts of perthiocyanic zinc pigment as made in Example 4, 800 parts urea-formaldehyde lacquer, 90 parts toluene, and 75 parts n-butyl alcohol. The product was thixotropic and was diluted with 90 parts toluene and 75 parts n-butyl alcohol before brushing out on steel panels. The dry panels were baked at 140° C. for ten minutes, resulting in hard, well-adhering enamel coatings. It is to be noted that paints made with zinc sulphide or zinc white are often thixotropic as was found to be the case in Examples 10, 11 and 12.

The hereinabove-described examples are illustrative of methods that can be employed for the production of pigments and of some uses for perthiocyanic metal derivatives as paint pigments. They can be employed in paints to form solid adherent coverings when spread on a surface in thin coats for decoration, protection, or both. The nature of said solid adherent covering depends largely on the vehicle in which the pigment is suspended and can in general be produced by air oxidation of said vehicle, as is usually the case with paints and varnishes taken as a class, or as in the case of lacquers, for example, by evaporation of the solvent or thinner, with or without added heating. Perthiocyanic metal derivatives serve equally well as pigments when admixed with vehicles that produce the solid adhering coverings by air oxidation or dry by evaporation of a thinner. Among the latter type vehicles can be included vehicles comprising thermosetting materials, such as lacquers made with urea-formaldehyde, melamine-formaldehyde and alkyd resins, or comprising thermoplastic materials, such as modified cellulose vehicles, for example, cellulose esters and ethers. It is to be understood that for the purpose of this application the term perthiocyanic metal derivative includes both the completely and any incompletely ploymerized products of thiocyanic acid produced as hereinabove described and forming metallic salts that have the characteristics set forth.

The invention as hereinabove set forth is embodied in particular form and manner but may be variously embodied within the scope of the claims hereinafter made.

It is to be understood that the term "metal salt of perthiocyanic acid" as used in the claims includes the relatively pure metal salts of perthiocyanic acid as well as the metal salts of perthiocyanic acid as produced by the processes described herein.

I claim:

1. A pigment composition comprising a mobile solidifiable hard non-tacky film forming pigment carrying vehicle containing as an essential pigment ingredient a water-insoluble metal salt of perthiocyanic acid.

2. A solidifiable adherescent covering-paint comprising a pigment carrying hard non-tacky film-forming vehicle containing as a pigment ingredient a colored water-insoluble metal salt of perthiocyanic acid to the extent of 35 to 50% by weight of the vehicle.

3. A composition of colored matter comprising a mobile solidifiable hard non-tacky film forming pigment carrying vehicle containing as an essential pigment ingredient a water-insoluble salt of perthiocyanic acid containing a plurality of metals to produce the color desired.

4. As a composition of coloring matter, a mobile solidifiable pigment suspension comprising an organic solidifiable hard non-tacky film forming pigment carrying vehicle and a water-insoluble metal salt of perthiocyanic acid as an essential pigment ingredient.

5. As a new composition of matter, a pigment suspension comprising a thermosetting plastic material and a water-insoluble metal salt of perthiocyanic acid.

6. As a new composition of matter, a pigment suspension comprising a thermo-setting plastic, a vaporizable solvent, and a water-insoluble metal salt of perthiocyanic acid.

7. As a new composition of matter, a paint comprising a hard non-tacky film forming drying oil in which is dispersed as a pigment, a water-insoluble salt of perthiocyanic acid containing a plurality of metals to produce the desired color.

8. A freely flowing suspension for coating purpose comprising a mobile air-drying, hard non-tacky film forming solidifiable organic liquid pigment carrying vehicle and a water-insoluble metal salt of perthiocyanic acid.

9. A coating suspension comprising an aminoplastic lacquer and a water-insoluble metal salt of perthiocyanic acid.

10. A lacquer composition comprising a cellulose plastic, a thinning solvent, and a water-insoluble metal salt of perthiocyanic acid as an essential pigment ingredient.

11. A composition of matter comprising a thermosetting cellulose plastic acting as a pigment carrying vehicle and a water-insoluble metal salt of perthiocyanic acid as an essential pigment ingredient.

12. As a new composition of matter a pigment suspension comprising a solidifiable hard nontacky film forming pigment carrying vehicle containing as an essential pigment ingredient a water-insoluble metal salt of perthiocyanic acid, said metal being one or more of the group of heavy metals consisting of lead, manganese, copper, chromium, zinc, cadmium, cobalt, nickel, mercury, silver, vanadium, iron, thallium, uranium, antimony and cerium.

13. A pigment composition comprising a solidifiable hard non-tacky film forming pigment carrying vehicle containing as an essential pigment ingredient a water-insoluble metal salt of perthiocyanic acid and a metal sulphide.

WILLIAM H. HILL.